United States Patent [19]

Isachsen

[11] 4,236,584
[45] Dec. 2, 1980

[54] REAR FURROW WHEEL LOCKING STRUCTURE FOR DISK TILLERS AND THE LIKE

[75] Inventor: Henning Isachsen, St. Catherines, Canada

[73] Assignee: Deere & Company, Moline, Ill.

[21] Appl. No.: 29,214

[22] Filed: Apr. 12, 1979

[51] Int. Cl.³ .................... A01B 5/06; A01B 73/00
[52] U.S. Cl. .................................. 172/385; 172/386
[58] Field of Search ............. 172/278, 286, 290, 383, 172/385, 386, 427, 507, 603

[56] References Cited

U.S. PATENT DOCUMENTS

| | | | |
|---|---|---|---|
| 1,161,919 | 11/1915 | Biebinger | 172/385 |
| 2,779,261 | 1/1957 | Northcote et al. | 172/427 |
| 3,700,042 | 10/1972 | Patterson et al. | 172/385 |

OTHER PUBLICATIONS

Operator's Manual for John Deere 2200A Series Surflex Disk Tillers, Predelivery Instructions PDI-W25-1057.

*Primary Examiner*—Richard T. Stouffer

[57] ABSTRACT

A locking structure for a disk tiller or the like which simply and quickly secures the rear furrow wheel in either an operational or transport position. An elongated link is pivotally connected to the disk tiller frame. The link is received in a guide structure carried by the disk tiller frame and is reciprocably shifted to vary the angular position of the rear furrow wheel support arm relative to the disk tiller frame. A pair of horizontally spaced latching pins are carried adjacent the guide, are biased towards the link and are selectively and alternatively engageable with abutment surfaces on the link to secure it in either of two spaced reciprocable positions.

8 Claims, 4 Drawing Figures

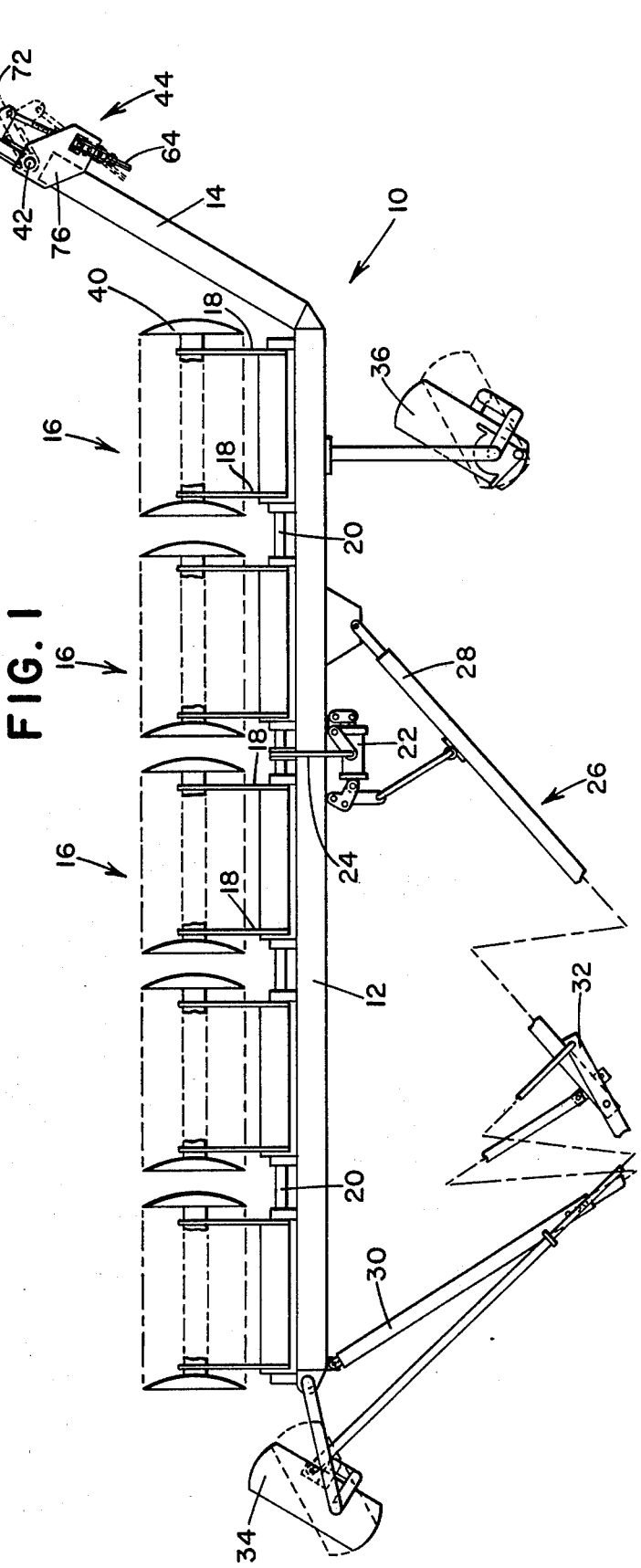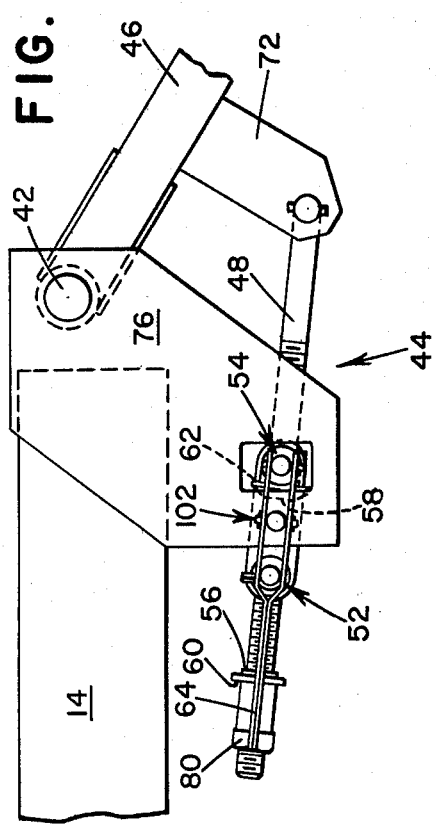

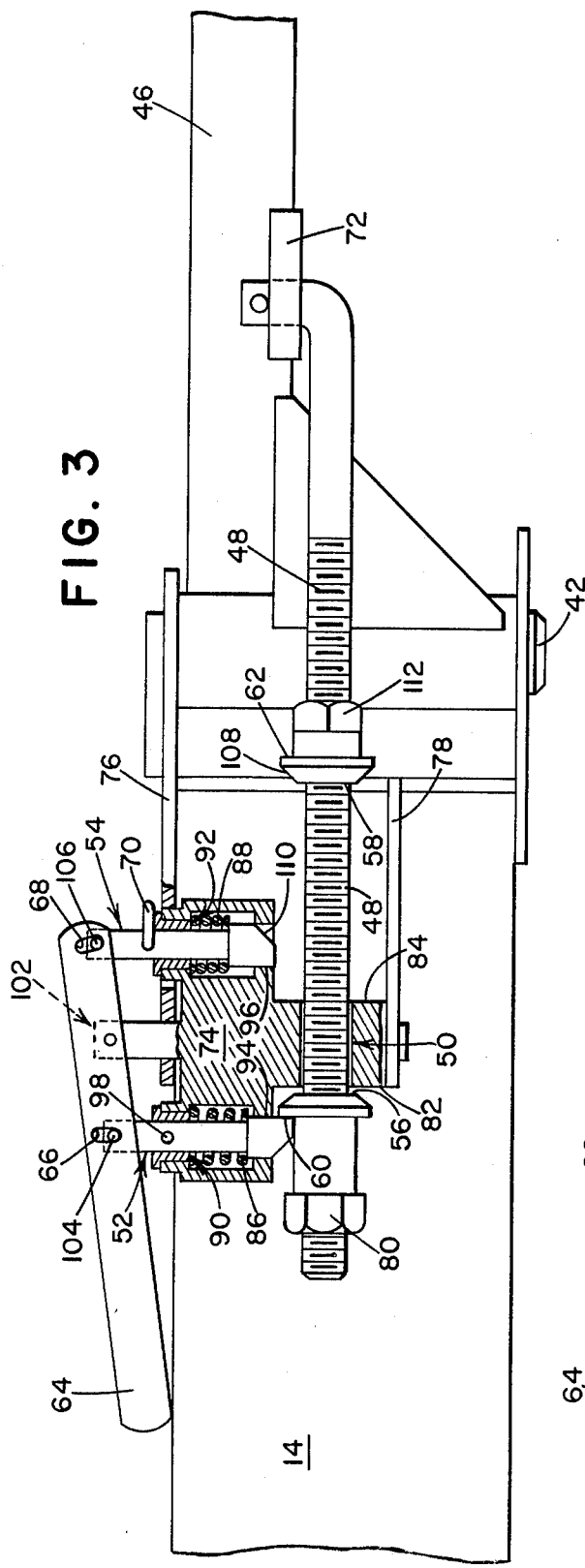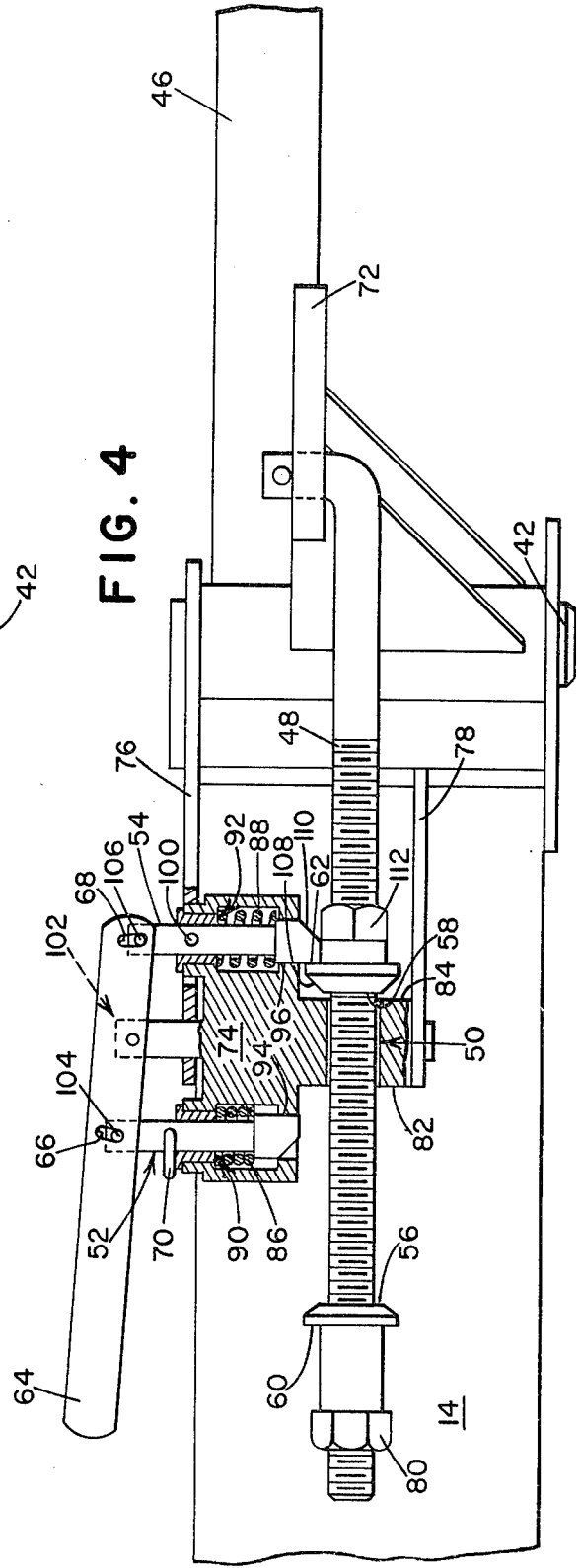

REAR FURROW WHEEL LOCKING STRUCTURE FOR DISK TILLERS AND THE LIKE

BACKGROUND OF THE INVENTION

The present invention relates generally to agricultural implements and more particularly to a locking structure for the rear furrow wheel of a disk tiller.

A conventional disk tiller includes an elongated frame adapted to be pulled at an angle to the direction of travel and a plurality of ground-working disks mounted along the rear side of the frame and adapted to be raised and lowered into engagement with the ground.

The frame is supported relative to the ground by a front and a rear furrow wheel adapted to travel in furrows left by the disks and a land wheel carried near the rear of the machine and forwardly of the frame. Because disk tillers and the like typically have a substantial working width, provision in the design must be included to enable the implement to trail in a substantially narrowed configuration.

Conventional rear furrow wheel arrangements generally provide for locking of the rear furrow wheel in a desired angular relationship to the frame during operation.

One method commonly used to narrow the implement from its operating width provides for swinging the rear furrow wheel to a different angular position relative to the main frame so that the tail portion of the implement trails directly behind the tractor or towing vehicle.

In U.S. Pat. No. 2,779,261 to Northcote et al, provision is made to adjust the angular position of the furrow wheel support beam and furrow wheel relative to the main frame. The adjustment is effected by swinging the wheel support beam about a vertical pivot on the main frame and locking it in place with bolts inserted through openings of vertically spaced, horizontally disposed brackets carried on the main frame. This method of changing and securing the rear furrow wheel in a new angular position relative to the main beam can demand a significant amount of operator time.

Another method of locking the rear furrow wheel in its transport position is found in U.S. Patent 3,700,042 to Patterson et al. Patterson provides a locking structure to secure the rear furrow wheel in a transport position and a yieldable structure permitting the furrow wheel to swing in response to abnormal side loads on the wheel. The structure provided for in Patterson et al is composed of many parts and consequently is expensive to manufacture and maintain.

SUMMARY OF THE INVENTION

It is a primary object of the invention to provide a simple locking mechanism having few parts that can quickly, simply and easily lock the rear furrow wheel in either a transport or operating position. It is further an object to provide a mechanism that can be easily activated by the operator and once activated will lock automatically upon angular movement of the furrow wheel support beam relative to the disk tiller main frame.

The invention comprises generally a link extending between the disk tiller main frame member and the furrow wheel support member having one end pivotally secured to one member and the other end reciprocably supported by the other member, and a pair of spaced apart latch members biased towards the link and adapted for alternating engagement with abutment surfaces carried on the link. An actuating lever is connected to each pair of latch members to move them alternately between positions of engagement and disengagement with their respective abutment surfaces. The lever is manually shiftable between its alternate positions and a cotter key type locking structure is provided to secure each latch member in its disengaged position.

BRIEF DESCRIPTION OF THE DRAWINGS

The preferred embodiment of the invention will be described in conjunction with the accompanying drawings in which:

FIG. 1 is a plan view of a disk tiller incorporating the present invention. The support wheels are illustrated in their operational position by solid lines and in their respective transport positions by dotted lines.

FIG. 2 is an enlarged fragmentary plan view of the rear portion of the disk tiller illustrating the lockage mechanism when the rear furrow wheel is adjusted to its transport position.

FIG. 3 is an enlarged side view of the locking structure with a portion cut away to illustrate the latch members and housing therefor.

FIG. 4 is a view similar to FIG. 3 illustrating the locking structure in its alternate position.

DESCRIPTION OF THE PREFERRED EMBODIMENT

The disk tiller illustrated in FIG. 1 includes a generally L-shaped structure adapted to trail diagonally behind a towing vehicle. The L-shaped frame member 10 is composed of an elongated diagonal main beam 12 and a rigidly joined tail beam 14. A series of soil-working disks are mounted in gangs 16 and supported along the rear side of the main beam of frame 12 for movement into and out of engagement with the ground. Each gang 16 of disks is carried on a pair of spaced apart arms 18 which are resiliently coupled at their forward ends to an elongated shaft 20 that extends along the rear edge of the main beam 12.

A hydraulic cylinder 22 is carried at the forward edge of the main beam 12 and acts through the linkage 24 to rotate the shaft 20 and thereby raise or lower the gangs 16.

A forwardly converging V-shaped hitch structure 26 (illustrated only in part) is provided for towing the disk tiller by a tractor or similar vehicle. The hitch structure 26 includes a pair of elongated members 28 and 30 pivotally connected at their horizontally spaced apart rearward ends to the main beam 12. The hitch members 28 and 30 are pivotally interconnected at their forward ends. Also pivotally mounted to the forward portion of the hitch structure 26 is a steering arm 32 adapted at one end for connection to a tractor drawbar and connected at its other end to a front furrow wheel 34.

The L-shaped frame member 10 is supported relative to the ground by the forward furrow wheel 34, a land wheel 36 and a rear furrow wheel 38. The forward furrow wheel 34 is mounted on the front portion of the main frame 12 and is adapted to ride in the furrow formed by the rearmost disk blade 40 during the previous pass through the field. The land wheel 36 is adapted to ride on the untilled ground forward of the main frame 12. During normal operation, the rear furrow wheel 38 rides in the furrow formed by the rearwardmost disk 40 and serves to resist the tilling forces that tend to shift the implement sideways.

When the implement is to be transported, the rear furrow wheel 38 (as viewed in FIG. 1) must be swung clockwise about its pivotal connection 42 with the tail beam 14 from the operational position illustrated by solid lines in FIG. 1 to the transport position illustrated by dotted lines in FIG. 1. It is the locking structure 44 provided between the tail beam 14 and the rearwardly extending furrow wheel support arm 46 that secures the rear furrow wheel 38 in either its transport or operational position and constitutes the subject of the present invention.

The basic elements of the locking structure 44 are best illustrated in FIGS. 2, 3 and 4 and include a threaded bolt or link 48 pivotally connected at its one end to the support arm 46 and carried in a guide 50 supported by the tail beam 14 for reciprocable movement therein, a pair of horizontally spaced latching members 52 and 54 biased toward the link 48 and carried on either side of the guide means 50 for alternate engagement with the second of the outwardly projecting first and second abutment surfaces 56 and 58, and 60 and 62 carried on the link 48, and a lever 64 connected with each latch member 52 and 54 by slotted or lost motion connections 66 and 68 for raising each respective latch member 52 and 54 or lowering it to permit it to engage its respective abutment surface 60 or 62 on the link 48. A cotter key 70 is provided for maintaining the respective latch members 52 and 54 in their disengaged or elevated positions.

The threaded bolt or link means 48 extends horizontally between the tail beam 14 and wheel support arm 46 and has its rearward end portion pivotally mounted in a horizontally projecting ear 72 fixed to the wheel support arm 46. The forward end of the link 48 is received in the horizontal opening or guide means 50 that is carried within a housing 74 mounted between upper and lower horizontal plates 76 and 78 secured to the tail beam 14. Within this guide means 50 the link 48 is mounted for reciprocable movement between the positions illustrated respectively in FIGS. 3 and 4. The forward portion of the link 48 is threaded to receive the adjustable nut 80 and permit the range of reciprocable movement between the first abutment surfaces 56 and 58 to be varied. Accordingly, the angular range of movement of the wheel support arm 46 can be varied.

As illustrated in FIG. 3, the first abutment surface 56 of the link is adjacent a stop surface 82 carried on the housing 74 near the guide 50 and acts to restrict reciprocable movement of the link 48 to the right. In its alternate position, illustrated in FIG. 4, the link 48 is restricted against movement to the left by the stop surface 84 abutting the first abutment surface 58.

The upper part of the housing 74 also supports the latch members 52 and 54 for vertical reciprocable movement. Coil springs 86 and 88 surround the respective latch members 52 and 54 and act against the horizontal surfaces 90 and 92 of the housing 74 to urge the latch members 52 and 54 towards the link means 48. The lower end of each latch member 52 and 54 is provided with a vertical surface 94 and 96 that is engagable with a respective second abutment surface 60 or 62 on the link 48 to restrict movement of the link 48. As illustrated in FIG. 3, the vertical surface 94 of latch member 52 has engaged the second abutment surface 60 of the link 48 to restrict horizontal movement of the link 48 towards the left. Latch member 54, as illustrated in FIG. 4, has engaged the second abutment surface 62 of the link 48 to restrict horizontal movement of the link 48 towards the right. A horizontal opening 98 and 100 has been provided in each latch member 52 and 54 wherein the cotter pin or a similar locking means 70 can be inserted to prevent downward movement of that respective latch member 52 or 54.

The hand actuated lever 64 is pivotally mounted upon a fulcrum 102 and is connected to each respective latch member 52 and 54 by the lost motion connections 66 and 68. The lost motion connections 66 and 68 are each composed of a slot in the lever 64 that receives a horizontally extending pin 104 or 106 that is fixed to one respective latch member 52 or 54. The lost motion connections 66 and 68 are provided so as to permit the lever 64 to be swung about its fulcrum 102 to raise either latch member 52 or 54 sufficiently so that the horizontal opening 98 or 100 therethrough can be elevated above the housing 74 to permit the cotter key 70 to be inserted and subsequently prevent downward movement of the latch member 52 or 54.

In the normal operating position, the furrow wheel support arm 46 occupys a position relative to the frame member 12 as illustrated by the solid lines in FIG. 1. In this position, the locking structure elements occupy those positions illustrated in FIG. 3. As shown, the forwardly positioned latch member 52 is biased toward engagement with the link means 48 and has its upright engaging surface 94 in engagement with the second abutment surface 60 of the link 48 to restrict movement of the link 48 to the left. Movement of the link 48 to the right is restricted by engagement between the first abutment surface 94 and the stop surface 82 adjacent the guide means 50.

In this position, the latch member 52 fixes the position of the link 48 and the angular relationship between the rearwardly extending wheel support arm 46 and tail beam 14 so that the rear furrow wheel 38 can act to resist tilling forces that will urge the implement sideways.

When the operator desires to convert the implement to its transport configuration, it is necessary for him to raise the lever 64 from the position illustrated in FIG. 3 to that illustrated in FIG. 4. To accomplish this movement, the operator must first press down on the lever 64 so as to raise the latch member 54 to permit removal of the cotter pin 70 from the opening 100 in pin 54 and enable the latch member 54 to move toward its position of engagement with the link 48. The slotted lost motion connection 68 between latch member 54 and the lever 64 permits the lever 64 to swing on its fixed pivot or fulcrum 102 and raise the right latch member 54 sufficiently to insert the pin 70. The lost motion connection 66 permits the lever 64 to be rotated to lift pin 54 without forcing the pin 52 downwardly or breaking the pin 104 of latch member 52. Subsequent to removal of the cotter pin 70, the lever 64 is swung about its pivot point 102 to the position illustrated in FIG. 4 and the cotter key 70 inserted in the opening 98 through latch member 52. The link 48 is now free to slide from the position illustrated in FIG. 3 to the left to permit the furrow wheel arm 46 to be swung about its vertical pivot 42 from the position illustrated by solid lines in FIG. 1 to the position illustrated by dotted lines in FIG. 1.

To accomplish this swinging movement of the furrow wheel support arm 46, the operator would advance the implement through a turning manuever. As the link 48 is slidably shifted through the guide 50, the inclined surface 108 between the first abutment surface 58 and second abutment surface 62 will engage the complementary inclined surface 110 of the latch member 54. As the coil spring 88 is compressed, the lost motion connection 68 will permit the latch member 54 to ride up and over the collar-like projection and the spring 88 will then urge the latch member 54 downwardly so that the first abutment surface 58 engages the stop surface 84. As the latch member 54 rises above the collar-like projection of the link 48 and passes over the second abutment surface 62, the coil spring 88 will urge it down onto the internally threaded adjustment block or nut 112 and permit engagement of the upright surface 96 of the latch member 54 with the second abutment surface 62 of the link means 48. The link 48 is now secured by the stop surface 84 of the housing 74 and the latch member 54 and the rearwardly extending wheel support arm 46 is secured in its new angular relationship relative to the tail beam 14. A similarly inclined surface is provided between abutment surfaces 56 and 60.

Rotation of the nut 80 on the forward end of the link 48 is effective to change the angular relationship of the wheel support arm 46 relative to the tail beam 14 and therefore change the operational position of the furrow wheel 38 relative to the main beam 12. Rotation of the nut 112 on the line 48 is effective to change the position of the rearwardly extending arm 46 relative to the tail beam 14 while in its transport position.

I claim:

1. In an agricultural implement having a frame member, a support member carrying a ground-engaging wheel adapted to support the frame member, said support member pivotally connected with the frame member for swinging movement about an upright axis and an improved means between the frame member and support member for securing one said member in either a first or second position relative to the other said member comprising:
    an elongated link means carried by said one member;
    guide means carried by said other member and supporting the link means for reciprocable movement between a first and second position as the one member moves between its first and second position relative to the other member;
    first locking means between the link means and the other member for engagably locking the link means in its first position and the one member in its first position relative to the other member;
    second locking means between the link means and the other member for engagably locking the link means in its second position and the one member in its second position relative to the other member; and
    means cooperative with the first and second locking means for selectably urging either of said first or second locking means into engagement with said link means.

2. In an agricultural implement having a frame member, a support member including a ground-engaging wheel adapted to support the frame member, said support member pivotally connected to the frame member and adapted for swinging movement about an upright axis, and an improved means between the frame member and support member for securing one said member in either a first or second position relative to the other said member comprising:
    a generally horizontal elongated link means carried by said one member and having a pair of first and second spaced apart abutment surfaces;
    guide means carried by said other member and supporting the link means for reciprocable movement between a first and second position as the one member moves between its first and second positions relative to the other member;
    locking means carried by the other member for securing the link means in either its first or second position including latch means mounted substantially perpendicularly to the link means for reciprocable movement between a first position permitting engagement with the abutment surfaces of the link means and a second position not permitting said engagement, said latch means including a surface engagable with the first of each pair of abutment surfaces when the latch means is in its first position to limit reciprocable movement of the link means in one direction; and
    stop means registrable with the second of each pair of abutment surfaces on said link means to limit movement of the link means in the other direction.

3. The invention defined in claim 2 further including means for releasably maintaining said latch means in either its first position or its second position.

4. The invention defined in claim 2 further including a housing carried by the guide means, and the latch means includes a pair of spaced apart latch members slidably mounted for reciprocable movement in said housing and the means for releasably maintaining said latch members in their first and second position includes springs means acting on each latch member and urging it towards the link means.

5. The invention defined in claim 4 wherein the means for releasably maintaining said latch means in either its first or second position further includes a lever arm pivotally supported between its ends and between the latch members, coupled by lost motion connection to each said latch member and a pin means insertable through openings in either latch member and engageable with the housing to restrict movement of said member.

6. In an agricultural implement having a frame member, a wheel support member pivotally connected to the frame member and adapted for swinging movement about an upright axis, a groundengaging wheel carried by the support member, and an improved locking means between the frame member and support member for securing said members in either a first position relative to one another or a second position relative to one another comprising:
    a generally horizontal elongated link means carried by one said member;
    a pair of first and second horizontally spaced abutment surfaces carried on and projecting from the link means;
    guide means carried by the other said member and supporting the link means for reciprocable movement between the pairs of spaced apart abutment surfaces;
    first and second stop surfaces adjacent the guide means to alternatively limit movement of the link means in opposite directions upon one of said first abutment surfaces moving into engagement with one of said stop surfaces; and latching means carried by the other member including first and second latch members, one said latch member horizontally spaced from each said stop surface and engagable with a respective one of said second abutment surfaces of the link means when said one first abutment surface is engaged with one of said stop surfaces to restrict movement of the link means in the other direction; and means for selectively and releasably engaging each said latch member with its respective second abutment surface.

7. The invention defined in claim 6 wherein an inclined surface extends between one of said pair of first and second abutment surfaces on the guide means and the latch member which is engageable with said second abutment surface includes a complementary inclined surface.

8. In an agricultural implement having a frame member, a wheel support member pivotally connected to the frame member and adapted for swinging movement about an upright axis, a groundengaging wheel carried by the support member, and an improved locking means between the frame member and support member for securing said members in either a first position relative to one another or a second position relative to one another comprising:

a generally horizontal link means carried by one said member, said link means having horizontally spaced apart abutment surfaces;

guide means carried by the other said member and supporting the link means for reciprocable movement between first and second positions;

latching means carried by the other member, including first and second horizontally spaced apart latch members, each said latch member slidably mounted in a housing for reciprocable movement between first and second positions;

biasing means urging said latch members towards their first position;

lever means for moving said latch members from their first position including a lever arm pivotally carried on a fulcrum supported by the other member between the latch members, said lever arm coupled to each latch member with a lost motion connection; and releasable means on the other member for securing each said latch member in its second position.

* * * * *